United States Patent
Bregenzer et al.

(10) Patent No.: US 12,497,782 B2
(45) Date of Patent: Dec. 16, 2025

(54) THERMALLY INSULATING MOUNT FOR FACADES

(71) Applicant: Ineco Holding AG, Altendorf (CH)

(72) Inventors: Samuel Bregenzer, Wolfhausen (CH); Joel Studer, Wald (CH)

(73) Assignee: Ineco Holding AG (CH)

( * ) Notice: Subject to any disclaimer, the term of this patent is extended or adjusted under 35 U.S.C. 154(b) by 184 days.

(21) Appl. No.: 18/414,306

(22) Filed: Jan. 16, 2024

(65) Prior Publication Data
US 2025/0198165 A1    Jun. 19, 2025

(30) Foreign Application Priority Data
Dec. 15, 2023    (EP) .................................... 23217277

(51) Int. Cl.
| | | |
|---|---|---|
| E04F 13/08 | (2006.01) | |
| B32B 3/26 | (2006.01) | |
| B32B 9/04 | (2006.01) | |

(52) U.S. Cl.
CPC ............ *E04F 13/081* (2013.01); *B32B 3/266* (2013.01); *B32B 9/04* (2013.01); *B32B 2307/304* (2013.01); *B32B 2307/7376* (2023.05); *B32B 2607/00* (2013.01)

(58) Field of Classification Search
CPC .......... E04F 13/081; B32B 3/266; B32B 9/04; B32B 2307/7376; B32B 2307/304; B32B 2607/00
See application file for complete search history.

(56) References Cited

U.S. PATENT DOCUMENTS

| | | | | |
|---|---|---|---|---|
| 4,567,710 A | * | 2/1986 | Reed .......................... | E04C 2/54 264/296 |
| 2004/0123550 A1 | | 7/2004 | Hartman | |
| 2014/0178635 A1 | * | 6/2014 | Imaizumi ................ | B32B 7/027 428/192 |

FOREIGN PATENT DOCUMENTS

| | | |
|---|---|---|
| DE | 11 02 548 B | 3/1961 |
| DE | 2113741 A1 | 10/1972 |
| DE | 102012016025 A1 | 5/2014 |

* cited by examiner

*Primary Examiner* — Gisele D Ford
(74) *Attorney, Agent, or Firm* — Lerner David LLP

(57) ABSTRACT

A thermally insulating mount (3) for attaching a front structure to a supporting structure has the following components:
a) a base part (4), which has a base surface (5.1) for stable support on the supporting structure and a spacer plate holder (7) perpendicular to the base surface (5.1);
b) a spacer plate (9) made of a thermally insulating material, wherein the spacer plate has an inner end section and an outer end section and wherein the spacer plate (9) has at least two through holes at its inner end section (9.1);
c) at least two pin connections (8.1, 8.2), each of which penetrates one of the at least two holes and creates a mechanically load-bearing connection between the spacer plate holder (7) of the base part (4) and the spacer plate (9).

The spacer plate (9) is a laminate that substantially consists of layers of muscovite mica paper to ensure a high tensile strength of the laminate and of silicone resin binder as matrix for firmly connecting the mica paper layers in the laminate.

15 Claims, 2 Drawing Sheets

THERMALLY INSULATING MOUNT FOR FACADES

FIELD OF THE INVENTION

The invention relates to a thermally insulating mount for attaching a front structure, e.g. a facade panel system, to a supporting structure such as an external building wall.

STATE OF THE ART

US 2004/123550 A1 (Hartmann) describes a building panel attachment system with improved energy efficiency respectively improved fire safety properties. The panels are connected with a structural angle bracket. The angle bracket has a base part and a head part made of aluminum. A web connects the base part and the head part. The web can also be made of metal, or it can be formed by a heat-insulating panel. A composite material consisting of continuous strand mat and glass fiber roving with phenolic resin matrix is used as the heat-insulating material.

A thermally insulated facade construction is known from EP 2,180,115 B1 (Wagner System AG). The construction uses a connecting part between the facade and the supporting structure, which has a base part, a head part and a spacer plate. Base part and head part consist of a bent-back aluminum or stainless steel sheet. The spacer plate is thermally insulating and made of glass fiber reinforced plastic (GFRP). It essentially bridges the space between the supporting structure and the facade.

The disadvantage of the known systems is that they are either thermally insulating but not fireproof or fireproof but not very thermally insulating.

SUMMARY OF THE INVENTION

The task of the invention is to create a mount for attaching a front structure to a supporting structure, which mount is both thermally insulating and fire-resistant, and which belongs to the technical field mentioned at the beginning.

The solution of the task is defined by the features of claim 1. According to the invention, the thermally insulating mount has the following components:
  a) a base part that has a base surface for stable support on the supporting structure and a spacer plate holder that is perpendicular to the base surface;
  b) a spacer plate made of a thermally insulating material, wherein the spacer plate has an inner end section and an outer end section and wherein the spacer plate has at least two through holes at its inner end section;
  c) at least two pin connections, each of which penetrates one of the at least two holes and creates a mechanically load-bearing connection between the spacer plate holder of the base part and the spacer plate;
  d) wherein the spacer plate is a laminate consisting substantially of layers of muscovite mica paper to ensure a high tensile strength of the laminate and of silicone resin binder as a matrix for firmly connecting the mica paper layers.

Features a) to c) are known from EP 2,180,115 B1.

The base part is designed to be securely fastened to the supporting structure, for example with a dowel anchor. The base surface ensures stable alignment. The spacer plate holder is a section of the base part that is designed to hold the spacer plate. The spacer plate should be substantially perpendicular to the base surface and therefore to the supporting structure (e.g. building wall).

The spacer plate is the core element for thermal insulation. The material should have a thermal conductivity of less than 1 W/m·K. Good values are in the range of 0.25 W/m·K and less. The material is substantially incombustible, i.e. it does not burn even when exposed to flame. The material is preferably stable up to 500° C. The holes at the inner end section can be of any shape. However, a round shape is preferred.

The at least two pin connections, each of which penetrates one of the at least two holes, should clamp and hold the spacer plate as a whole.

Advantages

The laminate according to the invention is mechanically resilient, thermally insulating and non-combustible. This has the advantage that the mount can be used without further ado for buildings in which the facade construction must be thermally insulating but must not contain any combustible materials (e.g. in high-rise buildings).

The mount according to the invention also has the advantage that, in terms of production technology, it can be very easily adapted to different distances. It is sufficient to insert a suitably cut-to-length spacer plate between the standardized base part and head part. In this way, different lengths of the mount can be produced with one type of head and foot part.

Furthermore, the material according to the invention has the advantage that it is easy and quick to process in terms of production technology.

The laminate is produced, for example, by impregnating a large number of layers of muscovite mica paper (as known, for example, from DE 11 02 548 B; General Electric) with the silicone resin binder and then connecting them in a press with heat to form a composite material. The resulting laminate substantially consists only of mineral muscovite mica and silicone resin binder. These two components make up at least 99% by weight of the composition of the laminate, for example. The remaining components are typically natural impurities in the muscovite mica and any traces of chemical substances from the manufacturing process.

In the following description—starting with the numbering 2—various special embodiments of the invention are explained.

Embodiment 2: At Least 85% by Weight Muscovite Mica

According to a particular embodiment of the invention, the muscovite-mica paper layers make up at least 85% by weight of the laminate. The proportion of silicone resin binder is advantageously not more than 15% by weight of the laminate. The traces of chemical substances from the manufacturing process in the laminate should be as low as possible and should not exceed, for example, 1% by weight of the laminate.

The laminate may contain small amounts of other components, e.g. potassium silicate, which increases the tensile strength of muscovite mica paper (as known, for example, from DE 11 02 548 B; General Electric).

Contrary to the above embodiment, laminates containing less muscovite mica paper, e.g. 80% by weight, are also within the scope of the invention. Accordingly, the proportion of silicone resin can be around 20% by weight, for example. Because the mica paper has a significantly higher heat resistance than the silicone resin, the heat resistance of the laminate will tend to be lower if the proportion of mica paper is reduced.

Embodiment 3: At Least 2% by Weight Silicone Resin

According to a particular embodiment of the invention, the silicone resin binder makes up at least 2% by weight of the laminate. Preferably, the silicone resin content is as low as possible and at the same time the mineral content in the laminate is as high as possible.

It has been found that a laminate with a silicone resin content of at least 8% by weight and at most of 12% by weight has a particularly good combination of tensile strength, heat resistance and low thermal conductivity. The tensile strength, for example, is approx. 180 MPa and the tensile modulus is approx. 62 GPa (according to ISO 527). The thermal conductivity is approx. 0.18 W/m·K (ISO 8301). The operating temperature is approx. 500° C. and the short-term maximum operating temperature is approx. 800° C.

This amount of binder ensures that the muscovite mica papers are reliably connected together. As a result, the composite layers achieve the desired mechanical strength (tensile strength).

In principle, the laminate should contain as little silicone resin as necessary. This means that the mineral content (mica component) should be as high as possible.

Contrary to the above embodiment, silicone resin contents of less than 2% by weight are also within the scope of the invention.

Embodiment 4: Spacer Plate has Length to Thickness in the Range 5-100

According to a particular embodiment of the invention, the spacer plate has a length-to-thickness ratio of between 5 and 100, in particular of at least 10. In other words, the spacer plate is thin. The smaller the cross-section of the spacer plate, the lower the heat dissipation through the plate. Consequently, high insulation values can be maintained with the mount.

In contrast to the above embodiment, ratios of length to thickness greater than 100 are also within the scope of the invention. However, the mechanical stability of the spacer plate is then rather low and therefore more mounts are required per square meter of facade. This can lead to a suboptimal insulation value for the entire building structure. This effect is particularly noticeable with high insulation requirements for the facade.

Embodiment 5: Constant Thickness of the Spacer Plate in the Range 2-10 mm

According to a particular embodiment of the invention, the spacer plate has a constant thickness. This is preferably in the range from 2 mm to 10 mm. If the thickness is less than 2 mm, the stable length of the spacer plate is too short. The maximum distance that can be bridged by the mount between the supporting structure and the front structure then becomes short. For thick insulation layers of e.g. 200 mm, such thin spacer plates are no longer very efficient.

In contrast to the above embodiment, spacer plates that are significantly thicker than 10 mm are also within the scope of the invention. They can be used to overcome large distances in a mechanically stable manner. However, the heat dissipation is then increased due to the relatively large cross-section. The thickness of the insulation layer is usually less than approx. 220 mm. The gain in mechanical stability then comes at the cost of increased heat dissipation.

Embodiment 6: Rectangular Spacer Plate

According to a particular embodiment of the invention, the spacer plate has an essentially rectangular outer contour. Such a shape typically results in optimum utilization of the material. This means that the consumption of spacer plate material for an insulated building envelope is advantageously low. In addition, such plates are easy to manufacture by cutting a piece from a long, strip-shaped plate of material.

In contrast to the above embodiment, spacer plates with a different outer contour, such as a trapezoidal outer contour, are also within the scope of the invention.

Embodiment 7: Spacer Plate has a Recess

In a particular embodiment of the invention, the spacer plate has a recess at its inner end section. This recess makes it possible to provide a centered hole in the base part. The centered hole is used to fix the base part to the supporting structure using a dowel anchor. The screw head of the dowel anchor is accessible due to the recess in the spacer plate. The recess is wedge-shaped or rectangular, for example.

In contrast to the above embodiment, it can also be advantageous if the spacer plate forms a closed rectangular surface (i.e. closed apart from the holes for the pin connections to the base part). Such spacer plates are particularly easy to manufacture.

It is also possible that two or more recesses are provided in the spacer plate, e.g. to save weight or for special assembly purposes.

Embodiment 8: U-Profile on the Base Part

According to a particular embodiment of the invention, the spacer plate holder of the base part forms at least one u-profile. The u-profile has a slot width that corresponds to the thickness of the spacer plate, so that the spacer plate can be inserted into the u-profile during production of the mount. The at least two pin connections penetrate the u-profile (i.e. both flanks of the u-profile). Preferably, the thickness of the u-profile and the spacer plate are adapted to each other such that the spacer plate is clamped with both flanks of the u-profile when the pin connection is attached. In the present embodiment, a single continuous u-profile can be provided or, for example, two u-profiles aligned with each other can be provided.

In contrast to the above embodiment, it is also within the scope of the invention that a flat connection is provided instead of the u-profile, in the sense that the spacer plate is fixed on one side to a plate-shaped end of the base part.

Embodiment 9: Head Part

According to a particular embodiment of the invention, the mount has as a further component a head part with a connecting part. The connecting part is attached to the outer end section of the spacer plate with at least two pin connections in a mechanically load-bearing manner.

The head part is used to attach the facade system to the mount. This structure of the mount allows the manufacturer to adapt the mount to different facade systems. When ordering the mount, the customer specifies the facade system to which the mount is to be adapted. The manufacturer can then combine a standardized base part with a spacer plate and attach the matching head part to the outer end of the spacer plate.

In contrast to the above embodiment, the invention also includes mounts that only consist of base part and spacer plate. If the manufacturer therefore does not offer any head parts, it is up to the user how he attaches the facade system to the spacer plate. The facade manufacturer can then provide his preferred fastening parts as a connection to the spacer plate.

Embodiment 10: U-Profile on the Head Part

According to a particular embodiment of the invention, the connecting part of the head part forms at least one u-profile which embraces the outer end section of the spacer plate on both sides. This u-profile is adapted to the thickness of the spacer plate in the same way as the u-profile of the base part. It is also penetrated on both sides by a pin connection, which connects the head part to the spacer plate. As the u-profile surrounds the spacer plate on both sides, a mechanically very load-bearing connection with the spacer plate is ensured.

In contrast to the above embodiment, the invention also includes head parts which, for example, substantially only form a flat plate or a T-profile. In this case, a cost-effective solution can be created with a one-sided connection (i.e. the spacer plate and head part are placed against each other at the side and connected with a through pin connection).

Embodiment 11: Adapter Element on the Head Part

In a particular embodiment of the invention, the head part has at least one adapter element for attaching the front structure to the mount. The adapter element has, for example, the form of a clamping finger, of an insertion slot or of a c-profile. The adapter element can also be a specifically placed hole for screwing a support of the substructure of the facade. This means that the physical shape of the head part is adapted to the facade substructure. The adapter element can, for example, be designed so that a support can be temporarily clamped in place before it is permanently fixed.

In contrast to the above embodiment, the invention also includes head parts that are essentially designed as simple rectangular plates (but at least with holes for the pin connection to the spacer plate).

Embodiment 12: Rivet Connections

According to a particularly preferred embodiment, the pin connections are designed as rivets. If the base part respectively head part forms a u-profile, it does not matter which side the head of the rivet is on.

In contrast to the above embodiment, pin connections in the form of a screw and nut or other clamping means are also within the scope of the invention.

Embodiment 13. Mirror-Symmetrical Base Part

In a particular embodiment of the invention, the base part is mirror-symmetrical with respect to a plane perpendicular to the base surface. In particular, the openings for the dowel anchors are mirror-symmetrical with respect to the center plane defined by the spacer plate. This is advantageous for the statics of the mount.

In contrast to the above embodiment, non-symmetrical base parts are also within the scope of the invention. In practice, it will often be necessary to design individual mounts asymmetrically in order to do justice to a special feature of the facade. For example, L-shaped base parts will often be required for a facade. However, if the mount is not mirror-symmetrical and requires an eccentric opening for the dowel anchor, the aim is to keep the asymmetry as low as possible so that the resulting increasing moments on the dowel anchor are not too great.

Embodiment 14: Extruded Aluminum Profile

In a particular embodiment of the invention, the base part is formed from a piece of extruded aluminum profile. A single base part can thus be produced quite simply by cutting off a piece of the required length from a long profile.

Similarly, the head part can also be formed from an extruded aluminum profile piece.

The mount according to the invention can be assembled with little technical effort. Base part, head part and spacer plate are prepared by cutting off a piece of a long profile or a long strip of material. Holes are then drilled for the dowel anchors on the base part. If necessary, certain parts of the extruded profile are shortened. If necessary, the adapter elements (e.g. a slot, a hole for a pin connection) are attached to the head part. The holes for the pin connections are made on the spacer plate. Finally, the parts are joined together with the required number of pin connections.

In contrast to the above embodiment, head and base parts formed from a strip of sheet steel are also within the scope of the invention, as is known per se from the state of the art cited at the beginning.

Building with Mounts

The task of the invention is also to provide an insulated building with a facade that is both thermally insulated and fireproof on the outside.

According to the invention, the task posed is solved by a building with a supporting structure, in particular a building wall (e.g. made of concrete or brick), an external insulation on the supporting structure (e.g. a mineral insulating mat on the building wall) and a front structure, in particular a facade panel system, and a thermally insulating mount according to the invention. The mount anchors the front structure to the supporting structure.

Further advantageous embodiments and combinations of features of the invention result from the following detailed description and the entirety of the patent claims.

BRIEF DESCRIPTION OF THE DRAWINGS

The drawings used to illustrate the embodiment example show.

In principle, identical parts are marked with identical reference signs in the figures.

DETAILED DESCRIPTION OF THE DRAWINGS

Figure 1:
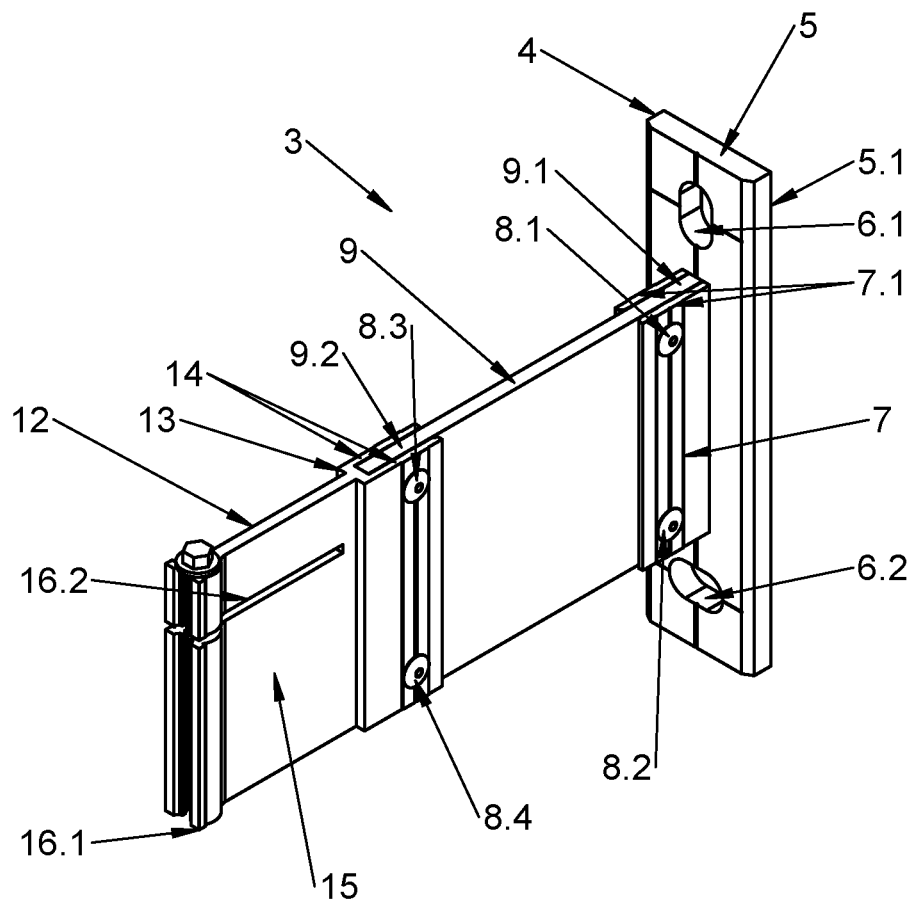
FIG. 1 a preferred embodiment of the mount according to the invention with a full-surface spacer plate.

The mount 3 shown in FIG. 1 consists of a base part 4, a spacer plate 9 and a head part 12. Base part 4 and spacer plate 9 are mechanically connected via 2 pin connections 8.1, 8.2. In the same way, spacer plate 9 and head part 12 are connected to each other via two pin connections 8.3 and 8.4. The mount 3 is provided in this form by the manufacturer, for example, and fitted to the building by the construction worker on site (see FIG. 4).

According to embodiment 14, the base part 4 is substantially made of an extruded aluminum profile.

The base part has a base plate 5 in the form of a long rectangular strip, which is aligned vertically when the mount 3 is installed. In this orientation, there is a first hole 6.1 at the upper end of the base plate 5 and a second hole 6.2 at the lower end of the base plate 5. The upper hole 6.1 is an elongated hole with a vertical longitudinal axis; the lower hole 6.2 is an elongated hole with a horizontal longitudinal axis, which allows precise adjustment of the base plate 5 on the supporting structure.

A spacer plate holder 7 is formed between the two holes 6.1, 6.2 in the vertical direction (installation orientation), which is perpendicular to the base surface 5.1 and projects away from the base plate 5. According to embodiment 8 of the invention, it forms a u-profile 7.1. For this purpose, two strips are provided on the base plate 5 (opposite the base surface 5.1), which protrude vertically from the base plate and are spaced apart from one another. Between the two spaced strips (which form the flanks of the u-profile 7.1), a receiving space is formed for the inner end section 9.1 of the spacer plate 9. Each of the opposing strips has two holes that are aligned with each other in order to accommodate a through pin of the pin connection 8.1, 8.2. The two pin connections 8.1 and 8.2 therefore penetrate the u-profile on both sides in accordance with embodiment 8.

In the sense of embodiment 13, the mount 3 of FIG. 1 is mirror-symmetrical with respect to a vertical plane perpendicular to the base surface 5.1. In particular, the entire mount is mirror-symmetrical with respect to the vertical center plane defined by the spacer plate 9 (the directions mentioned here refer to the installation orientation). This has the advantage that the vertical loads that the mount absorbs are optimally transferred to the supporting structure via the dowel anchors. In other words, the greatest possible load can be absorbed for a given load capacity of the dowel anchors. If the mount is designed asymmetrically, moments can arise that require a reduction in the load per mount.

Figure 2:
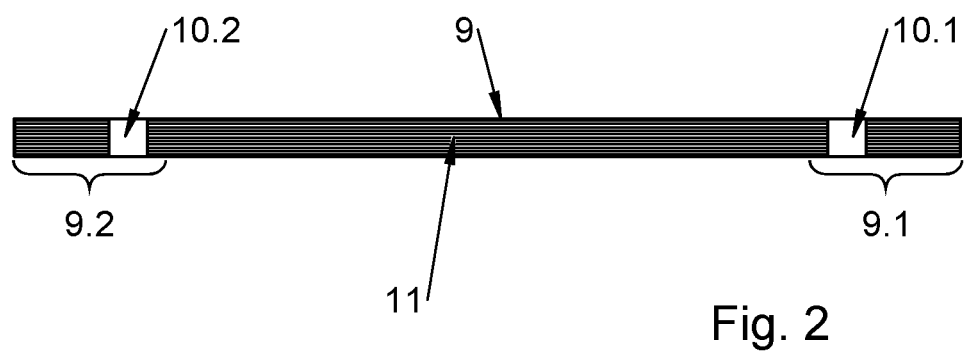
FIG. 2 is a schematic representation of a cross-section of a spacer plate according to the invention as shown in FIG. 1.

FIG. 2 shows a schematic cross-section of the spacer plate 9. It has a rectangular contour (compare FIG. 1) in the sense of embodiment 6 with an inner end section 9.1 and an outer end section 9.2. The inner end section 9.1 is accommodated in the u-profile 7.1 of the base part 4. The width of the u-profile substantially corresponds to the thickness of the spacer plate 9, so that the inner section of the spacer plate lies flush between the flanks of the u-profile. Two holes 10.1 are provided in the inner end section 9.1 for the two pin connections 8.1, 8.2, which pass through the spacer plate (they are located one behind the other in the direction of view of FIG. 2). The diameter of the holes 10.1 is matched to the diameter of the pin of the pin connection so that the hole and pin are essentially flush and the pin can engage with all layers of muscovite mica paper.

As shown schematically in FIG. 2, the spacer plate 9 is a laminate consisting of many thin layers of muscovite mica paper 11 (also known as muscovite mica foils). The individual layers of muscovite mica paper consist mainly of mineral mica of the muscovite type. Muscovite is chemically defined with the following molecular formula:

$$K\ Al_2[AlSi_3O_{10}(OH)_2]$$

Since muscovite mica is a natural product, there are always unavoidable mineral impurities in the muscovite mica paper. However, these impurities have no relevant influence on the properties of fire resistance, mechanical stability and thermal conductivity of the muscovite mica paper, which are decisive for the invention.

The muscovite mica papers have a film thickness in the range of e.g. 0.3-0.6 mm. For a spacer plate with a thickness of 5-6 mm, for example, 10-20 layers are pressed together. As matrix and binder between the layers of muscovite mica paper a silicone resin is present. If one looks at the laminate as a whole, it consists almost exclusively of muscovite mica paper and silicone resin. These two components typically make up at least 99% by weight of the laminate.

For the spacer plate 9 of FIG. 1, for example, a composition of approximately 90% by weight muscovite mica paper and approximately 10% by weight silicone resin binder is selected. This corresponds to embodiment 2 and also embodiment 3.

The spacer plate 9 of FIG. 1 has, for example, a length of 200 (measured from the inner end to the outer end) mm, a width of, for example, 80 mm (measured in vertical direction of the installation orientation) and a thickness of 5 mm. This results in a ratio of length to thickness of 40 (corresponding to embodiments 4 and 5).

As further indicated in FIG. 2, there are two holes 10.1 in the outer end section 9.2 (they are located one behind the other in the direction of view of FIG. 2). These are used to attach the head part 12 shown in FIG. 1. The head part 12 is formed from an extruded aluminum profile piece. A u-profile 14 is formed on this as a connecting part 13, the width of which is adapted to the thickness of the spacer plate 9 in a manner as described in connection with the u-profile 7.1 of the spacer plate holder 7. The head part 12 therefore corresponds to embodiment 10.

The head part 12 has a plate part 15, at the inner end of which is the u-profile 14 and at the outer end of which is an adapter element 16.1 in the form of a c-profile. The c-profile runs vertically in the installation orientation, i.e. along the plate part 15. The c-profile is used to fix the facade substructure (see FIG. 4). A horizontal slot is provided as a further adapter element 16.2, into which a support of the facade substructure can be inserted. In this way, the head part 12 implements embodiment 11.

Figure 3:
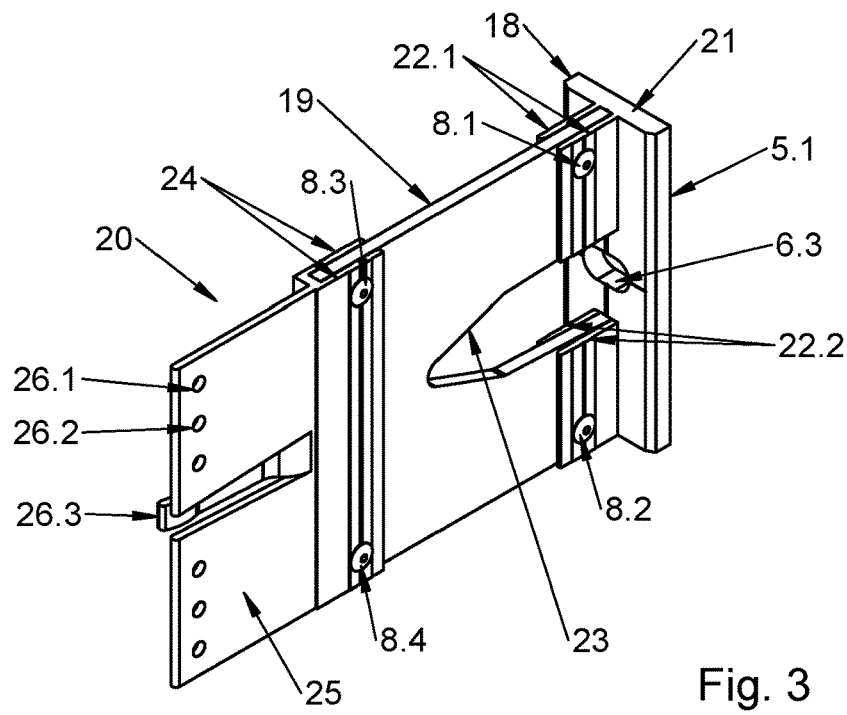
FIG. 3 a second preferred embodiment of the mount according to the invention with a spacer plate with a recess.

FIG. 3 shows another embodiment. The mount again consists of a base part 18, a spacer plate 9 and a head part 12. The three components are again connected via 4 pin connections 8.1-8.4.

The pin connections each have a pin element (e.g. bolt) and a clamping element (e.g. rivet, nut). They are preferably rivet connections according to embodiment 12.

The base part 18 differs from the base part 4 of the embodiment of FIG. 1 in that it has two u-profiles 22.1, 22.2 arranged in alignment one above the other in the installation orientation. The upper u-profile 22.1 extends to the upper edge of the base plate 21, while the lower u-profile 22.2 extends to the lower edge of the base plate 21. The hole 6.3 is located between the two u-profiles 22.1, 22.2. The hole 6.3 is arranged in the center of the base plate 18. Overall, the base part 18 is mirror-symmetrical to the vertical center plane of the base plate 18 (embodiment 13).

The spacer plate 19 has a rectangular outer contour with a length of e.g. 200 mm and a width of e.g. 180 mm. It also has a recess 23 at the inner end section. This creates a free space in the spacer plate 19 in front of the hole 6.3. The recess makes it possible to insert a screw through the hole 6.3 when attaching the mount to the building wall. Viewed from above (i.e. perpendicular to the plate plane), the spacer plate 19 has two arms or sockets in the inner end section. The recess is a combination of a rectangle and a triangle (wedge shape). The thickness of the spacer plate is 8 mm, for example.

The laminate of which the spacer plate 19 is made has about 88% by weight of muscovite mica paper and about 12% by weight of silicone resin binder, with traces of other substances from the manufacturing process of not more than 1% by weight being neglected. This corresponds to embodiment 2 and also embodiment 3.

The head part 20 has a u-profile 24 with two through holes (not shown) for the pin connections 8.3, 8.4. A plate part 25 adjoins the bridge part of the u-profile 24. Adapter elements, namely holes 26.1, 26.2 and a clamping finger 26.3 are formed on this. The clamping finger 26.3 helps with installation by clamping a support profile until it is screwed tight.

The head part 20 is not mirror-symmetrical with respect to the vertical plane (spacer plate plane). Rather, the plate part 25 is slightly displaced from the center so that the support profile, which is held by the clamping finger 26.3, lies in the plane of the spacer plate 19. The head part as a whole forms a quasi h-shaped profile.

Figure 4:
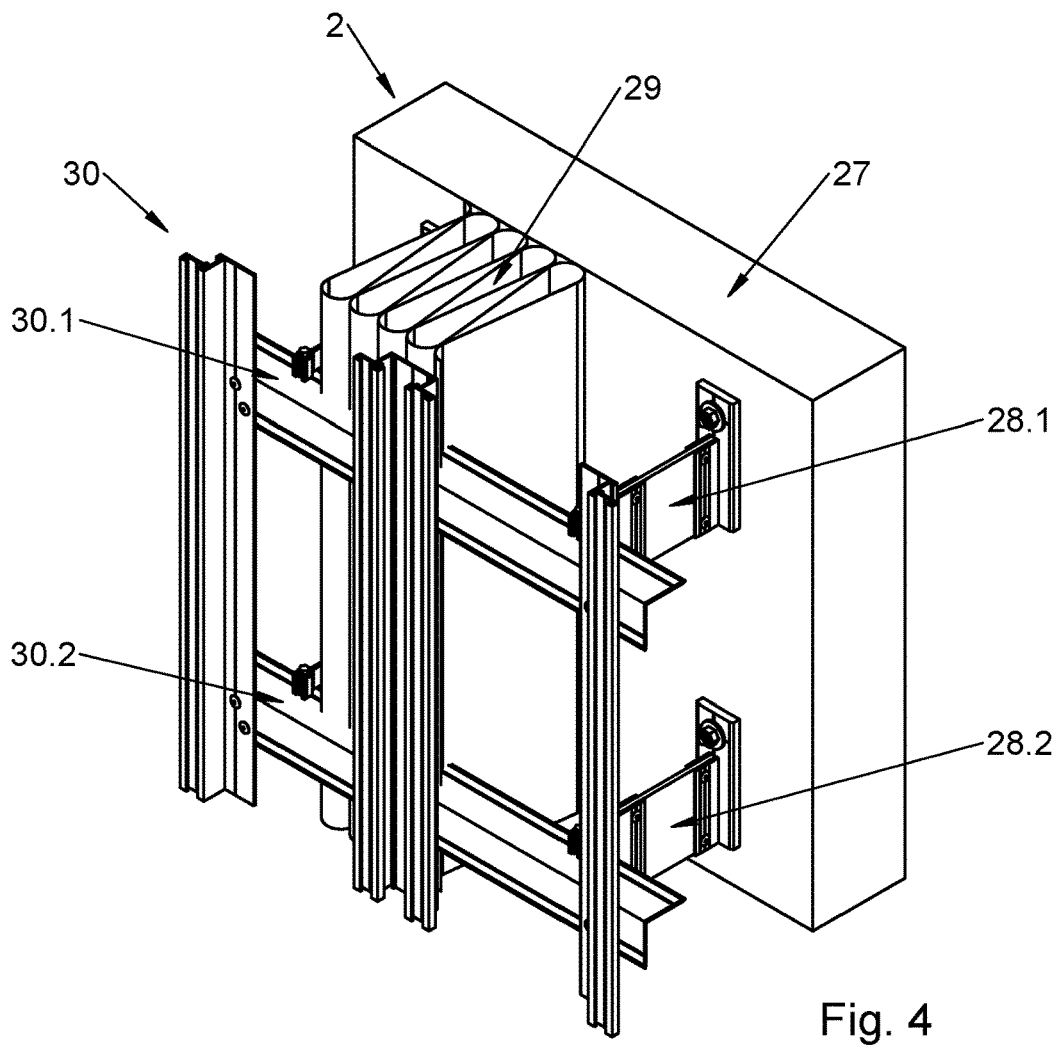
FIG. 4 a schematic representation of a building with a mount according to the invention.

FIG. 4 shows schematically how a front structure 30 is attached to a supporting structure 2, resulting in an externally insulated building structure. The mounts 28.1, 28.2 according to the invention are attached to the concrete wall 27, which is an external building wall, using dowel anchors. In the present example, the base part of the mounts 28.1, 28.2 is provided with only one hole for a dowel anchor.

When the mounts 28.1, 28.2 are fixed in their intended locations, an external insulation 29 (e.g. in the form of stone wool or glass wool) is laid on the concrete wall 27. The external insulation 29 has a thickness of 180 mm, for example. In this example, the mounts 28.1, 28.2 sink largely into the external insulation. Only the outer end of the head part with the adapter elements is visible. Next, the substructure 30 of the facade is suspended from the mounts 28.1, 28.2. In this example, horizontal beams 30.1, 30.2 are inserted into the horizontal slots (compare FIG. 1 adapter element 16.2) of the head parts and fixed. Then, other parts (e.g. vertical beams) of the substructure are attached to the beams 30.1, 30.2. Finally, the facade panels (not shown) are suspended from the substructure.

To summarize, it should be noted that the embodiments described can be modified in a wide variety of ways. In particular, the base part can be adapted almost at will to the structural characteristics of the individual case. Although clamping the spacer plate on both sides using a u-profile offers particular advantages in terms of mechanical load-bearing capacity, this is not mandatory.

Depending on requirements, the spacer plate can be just long enough to be fully embedded in the insulation layer of the building. However, it can also protrude from this and bridge the air space in a rear-ventilated facade.

The purpose of the head part is to enable simple installation of the facade substructure. Since there are a wide variety of facade constructions, the mount according to the invention can be adapted to the different variants.

The spacer plate holder on the base part can be formed in the simplest way by a plate part (e.g. by a leg of an L-profile-shaped base part). Holes for attaching the spacer plate are provided in this plate part, for example.

LIST OF REFERENCE SIGNS

2 Supporting structure
3 Mount
4 Base part
5 Base plate
5.1 Base surface
6.1, 6.2 Hole in the base plate
7 Spacer plate holder
7.1 u-profile
8.1, 8.2, 8.3, Pin connection (rivet connection) 8.4
9 Spacer plate
9.1 Inner end section
9.2 Outer end section
10.1, 10.2 Hole
11 Muscovite mica paper layers
12 Head part
13 Connecting part
14 u-profile
15 Plate part
16.1, 16.2 Adapter element
18 Base part
19 Spacer plate
20 Head part
21 Base plate
22.1, 22.2 u-profile
23 Recess
24 u-profile
25 Plate part
26.1, 26.2 Holes
26.3 Clamping finger
27 Concrete wall
28.1, 28.2 Mount
29 External insulation
30 Substructure of the facade
30.1, 30.2 Beam

We claim:

1. A thermally insulating mount for attaching a front structure to a supporting structure, comprising:
a base part, having a base surface for stable support on the supporting structure and a spacer plate holder perpendicular to the base surface,
a spacer plate made of a thermally insulating material, wherein the spacer plate has an inner end section and an outer end section and wherein the spacer plate has at least two through holes at its inner end section,
at least two pin connections, each of which penetrates one of the at least two holes and creates a mechanically load-bearing connection between the spacer plate holder of the base part and the inner area of the spacer plate,
wherein the spacer plate is a laminate consisting substantially of layers of muscovite mica paper to ensure a high tensile strength of the laminate and of silicone resin binder as matrix for firmly connecting the layers of mica paper in the laminate.

2. The mount according to claim 1, wherein the muscovite-mica paper layers make up a proportion of at least 85% by weight, in particular 88% to 92% by weight, of the laminate.

3. The mount according to claim 1, wherein the silicone resin binder makes up a proportion of at least 2% by weight, in particular at least 5% by weight, and particularly preferably 8-12% by weight.

4. The mount according to claim 1, wherein the spacer plate has a length-to-thickness ratio of between 5 and 100, in particular of at least 10.

5. The mount according to claim 1, wherein the spacer plate has a constant thickness in the range from 2 mm to 10 mm.

6. The mount according to claim 1, wherein the spacer plate has a substantially rectangular outer contour.

7. The mount according to claim 1, wherein the spacer plate has a recess at its inner end section.

8. The mount according to claim 1, wherein the spacer plate holder forms at least one u-profile, wherein a slot width of the u-profile corresponds to a thickness of the spacer plate and wherein the at least two pin connections, which connect the spacer plate to the base part, penetrate the u-profile on both sides.

9. The mount according to claim 1, further comprising a head part with a connecting part, the connecting part being attached in a mechanically load-bearing manner with at least two further pin connections in the outer end section of the spacer plate.

10. The mount according to claim 9, wherein the connecting part of the head part forms at least one u-profile which embraces the outer end section of the spacer plate on both sides.

11. The mount according to claim 9, wherein the head part has an adapter element, in particular a clamping finger, an insertion slot or a c-profile for attaching the front structure to the mount.

12. The mount according to claim 1, wherein the pin connections are rivet connections.

13. The mount according to claim 1, wherein the base part is mirror-symmetrical with respect to a plane perpendicular to the base surface.

14. The mount according to claim 1, wherein the base part is formed from an extruded aluminium profile piece.

15. A building with a supporting structure, in particular a building wall, an external insulation on the supporting structure, a front structure, in particular a facade panel system, and a thermally insulating mount for attaching the front structure to the supporting structure, comprising:

a base part, having a base surface for stable support on the supporting structure and a spacer plate holder perpendicular to the base surface, a spacer plate made of a thermally insulating material, wherein the spacer plate has an inner end section and an outer end section and wherein the spacer plate has at least two through holes at its inner end section, at least two pin connections, each of which penetrates one of the at least two holes and creates a mechanically load-bearing connection between the spacer plate holder of the base part and the inner area of the spacer plate, wherein the spacer plate is a laminate consisting substantially of layers of muscovite mica paper to ensure a high tensile strength of the laminate and of silicone resin binder as matrix for firmly connecting the layers of mica paper in the laminate;

wherein the thermally insulating mount anchors the front structure to the supporting structure.

* * * * *